INVENTORS
Karl Göran Ernst Fröman
Stig Rutger Kärker
Taivo Tarandi

BY Pierce, Scheffler & Parker
ATTORNEYS

United States Patent Office 3,507,522
Patented Apr. 21, 1970

3,507,522
PIPE JOINT
Karl Göran Ernst Fröman, Solna, Stig Rutger Kärker, Bandhagen, and Taivo Tarandi, Lidingo, Sweden, assignors to Aktiebolaget Atomenergi, Stockholm, Sweden, a company of Sweden
Filed Nov. 30, 1965, Ser. No. 510,514
Claims priority, application Sweden, Dec. 15, 1964, 15,155/64
Int. Cl. F16l 7/00, 9/00, 21/08
U.S. Cl. 285—187                           2 Claims

ABSTRACT OF THE DISCLOSURE

A pipe joint for two metallic pipe ends, the pipe ends being overlapped and a clamping ring being applied over the overlapped portions of the outer and inner pipe ends. The inner pipe end has a coefficient of thermal expansion which is greater than that of the outer pipe end and the clamping ring has a coefficient of thermal expansion which lies intermediate those of the two overlapped pipe ends. The inner pipe end is a stainless steel having an expansion coefficient of approximately $16.7 \cdot 10^{-6}$° C.; the outer pipe end is a zirconium alloy having an expansion coefficient of $6.1 \cdot 10^{-6}$° C.; and the clamping ring is made from Inconel having an expansion coefficient of $$13.4 \cdot 10^{-6} \cdot \text{ C.}$$

The joint can be assembled and disassembled at room temperature, and the seal at the joint is automatically established as the joint is heated to its normal operating temperature by the fluid which is passed through it.

---

The present invention relates to a pipe joint for the connection of two pipes or tubes to each other.

When connecting two pipes or tubes having different coefficients of thermal expansion to each other problems as to sealing and strains in the tubes arise if the temperature thereof changes. This is particularly the case where the tubes carry working fluids of different kinds, such as steam, hot water etc.

The main object of the present invention is thus providing a pipe joint, which can withstand the strains encountered with changes in temperature and bringing about an effective sealing at working temperatures. Another object is to provide an effective joint between a pipe having a small wall thickness and another pipe of greater strength.

The pipe joint according to the invention comprises two pipe ends, one end of which the outer end, surrounding the other end, the inner end, and a clamping ring surrounding the connection area, and is characterized in that the pipe ends have different coefficients of thermal expansion and that the clamping ring has a coefficient of thermal expansion lying between those of the pipe ends. According to a preferred embodiment of the invention said outer end has a smaller coefficient of thermal expansion than has said inner end and this embodiment is adapted to be used at an elevated temperature. In this embodiment said outer end can have a smaller wall thickness and said inner end be of a greater strength than said outer end. Said inner end can be provided with a radially extending flange and the outer contact surface thereof can be spherically rounded. Furthermore, said outer pipe end can be outwardly conically widened.

Figure 1:
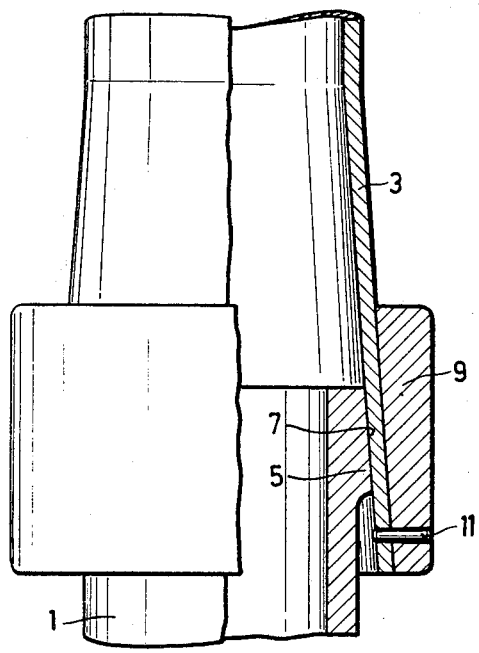
Figure 2:
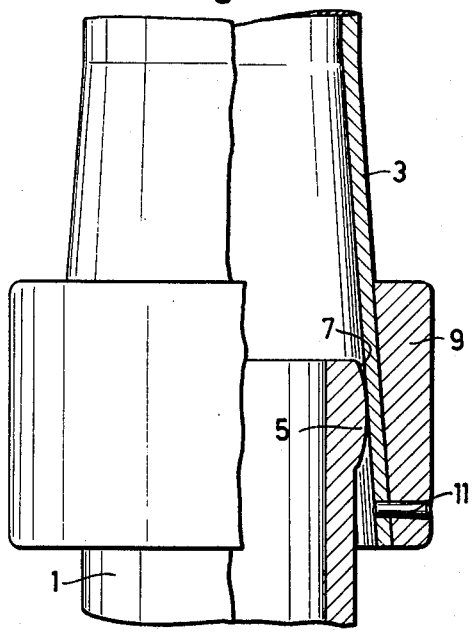

The invention will now be closer described by an example with reference to the appended drawing, where FIG. 1 shows an embodiment according to the invention and FIG. 2 shows a modified detail of the embodiment of FIG. 1.

The device in FIG. 1 is a joint between a bottom stud 1 attached to the bottom end of a reactor tank and the inner tube 3 in a so-called superheating duct, i.e. a duct, in which steam generated in the reactor is superheated. The bottom stud which has a tubular form is at its upper end provided with a radially extending flange 5, the outer contact surface 7 of which is upwardly conically tapered. In the present example the material of the stud is Bofors A286, a stainless steel having a coefficient of thermal expansion of approximately $16.7 \cdot 10^{-6}$° C. (20–270° C.). (In the present description all the figures given regarding coefficient of thermal expansion relate to linear expansion.)

The tube 3 of the superheating duct widens conically downwardly and the material of the tube is Zr–2, a zirconium alloy having a coefficient of thermal expansion of approximately $6.1 \cdot 10^{-6}$° C. (20–270° C.). As is seen from the figure the conical end of the tube 3 closely surrounds the flanged end of the stud 1.

The joint area of the stud 1 and the tube 3 is surrounded by a clamping ring 9, the inner side of which has a taper corresponding to that of the tube 3. The clamping ring is made of a material, the coefficient of thermal expansion of which lies between the coefficients of the stud 1 and the tube 3, in this case $13.4 \cdot 10^{-6}$° C. (20–270° C.) (Inconel X–750). The clamping ring is held on the tube 3 by means of conical pins 11 distributed around the periphery of the ring, one of which is shown in the figure, said pins from the outside being driven into holes in the ring 9 and the tube 3, respectively, below the sealing area.

The joint shown in FIG. 1 is based on the condition that sealing is to be obtained when the reactor has a certain temperature (for instance 160–270° C.), whereas disassembling and assembling of the joint can be carried out at room temperature. The assembling of the joint is carried out in the following manner:

The clamping ring 9 is brought onto the tube 3 from above at room temperature to engage the conical lower end of the tube. The Zircalloy tube 3 is then prestressed to a certain compressive strain, for instance 15 kp./mm.$^2$ by displacing the ring 9 downwardly on the tube a certain distance, determined in dependence of the taper. This can be carried out either by pressing the ring 3 downwardly the predetermined distance or by heating the ring and letting it fall said distance against a stop.

The superheating duct with the tube 3 and the clamping ring 9 is then placed over the stud 1 with the reactor waterfilled and in its cold condition and the penetration of the stud into the tube 3 is determined by the weight of the superheating unit. The temperature of the reactor is then brought to working temperature, (for instance approximately 270° C.). Due to the selected ratio between the coefficents of thermal expansion the tube 3 is clamped between the flange 5 and the clamping ring 9 at the same time as the compressive strain in the tube 3 changes into a tensile strain of for example 5 kp./mm.$^2$. Thanks to the prestressing of the Zircalloy tube 3 the resulting tensile strain is reduced by a corresponding amount to a value, which does not cause cracking in the material of said tube.

By means of the described device it is thus possible to obtain a satisfactory sealing with a small wall thickness of the Zr–2–tube 3 without subjecting the tube material to impermissible strain. At repeatedly increasing and decreasing the temperature of the joint the clamping ring 9 is prevented from moving on the tube 3 by means of the pins 11.

In FIG. 2 a modified design of the contact surface 7 of the flange 5 is shown, the contact surface being spherically rounded, in view of which the joint is less sensible to obliqueness between the tube 3 and the stud 1 in assembling the joint.

What is claimed is:

1. A pipe joint comprising two pipe ends, one of which, one outer end establishes an overlapping surface engagement with the other end, the inner end, and a clamping ring radially surrounding the overlapping areas of said pipe ends and frictionally engaging said outer end, said pipe ends being retained together solely by frictional engagement therebetween, said inner pipe end having a coefficient of thermal expansion greater than that of said outer pipe end, and said clamping ring having a coefficient of thermal expansion intermediate those of said inner and outer pipe ends, said inner pipe end frictionally, sealingly engaging said outer pipe end and said outer pipe end being placed and maintained in hoop tension by said inner pipe end, and a plurality of circumferentially spaced removable pins extending through holes in the wall of said clamping ring into aligned holes in said outer pipe end for securing said clamping ring against any longitudinal displacement on said outer pipe end which might arise as a result of repetitive increase and decrease of the temperature of said joint.

2. A pipe joint comprising inner and outer pipe ends arranged in overlapping surface engagement and which are retained together solely by frictional engagement therebetween, said inner pipe end including a flange portion at the part thereof which is overlapped by said outer pipe end, a clamping ring radially surrounding the overlapping surface areas of said pipe ends, said clamping ring including an inner tapered surface in frictional contact with a correspondingly tapered exterior surface on said outer pipe end, and a plurality of circumferentially spaced removable pins extending through holes in the wall of said clamping ring into aligned holes in said outer pipe end located between the end of said outer pipe end and said flange on said inner pipe end for securing said clamping ring on said outer pipe end against longitudinal displacement, said inner pipe end having a coefficient of thermal expansion greater than that of said outer pipe end, and said clamping ring having a coefficient of thermal expansion intermediate those of said inner and outer pipe ends, said inner pipe end frictionally and sealingly engaging said outer pipe end and said outer pipe end being placed and maintained in hoop tension by said inner pipe end.

References Cited

UNITED STATES PATENTS

| | | | |
|---|---|---|---|
| 1,066,290 | 7/1913 | Kraus | 285—174 |
| 2,632,431 | 3/1953 | Suter | 285—187 |
| 2,695,182 | 11/1954 | Folz | 285—286 X |
| 3,009,013 | 11/1961 | Raue et al. | 285—381 X |
| 3,056,615 | 10/1962 | Breitenstein | 287—187 |
| 3,114,471 | 12/1963 | Kropfl. | |
| 3,262,719 | 7/1966 | Gemma | 285—381 X |

FOREIGN PATENTS

| | | |
|---|---|---|
| 166,630 | 1/1956 | Australia. |
| 896,352 | 5/1962 | Great Britain. |

CARL W. TOMLIN, Primary Examiner

D. W. AROLT, Assistant Examiner